United States Patent [19]
Grob et al.

[11] Patent Number: 5,844,885
[45] Date of Patent: Dec. 1, 1998

[54] METHOD AND APPARATUS OF PROVIDING BIT COUNT INTEGRITY AND SYNCHRONOUS DATA TRANSFER OVER A CHANNEL WHICH DOES NOT PRESERVE SYNCHRONIZATION

[75] Inventors: Matthew S. Grob, La Jolla; Edward G. Tiedemann, Jr.; Abhijit Kudrimoti, both of San Diego, all of Calif.

[73] Assignee: Qualcomm Incorporated, San Diego, Calif.

[21] Appl. No.: 661,691

[22] Filed: Jun. 11, 1996

[51] Int. Cl.$^6$ .............................. H04L 1/00; H04L 7/00; H04Q 7/22; H04K 1/00
[52] U.S. Cl. .......................... 370/216; 370/429; 370/470
[58] Field of Search .................................. 370/216, 242, 370/394, 412, 428, 429, 470, 471, 517; 371/37.02; 380/49, 50; 395/182.16

[56] References Cited

U.S. PATENT DOCUMENTS

| | | | |
|---|---|---|---|
| 4,833,701 | 5/1989 | Comroe et al. | 379/60 X |
| 5,095,529 | 3/1992 | Comroe et al. | 455/16 |
| 5,325,432 | 6/1994 | Gardeck et al. | 380/21 |
| 5,360,781 | 11/1994 | Comroe et al. | 455/15 |
| 5,387,905 | 2/1995 | Grube et al. | 340/825.52 |
| 5,410,546 | 4/1995 | Boyer et al. | 371/37.02 |
| 5,420,909 | 5/1995 | Ng et al. | 379/58 |
| 5,450,405 | 9/1995 | Maher et al. | 370/58.2 |
| 5,463,617 | 10/1995 | Grube et al. | 370/29 |
| 5,465,391 | 11/1995 | Toyryla | 455/33.4 |
| 5,473,605 | 12/1995 | Grube et al. | 370/62 |
| 5,491,835 | 2/1996 | Sasuta et al. | 455/34.1 |
| 5,504,773 | 4/1996 | Padovani et al. | 371/37.02 |
| 5,511,232 | 4/1996 | O'Dea et al. | 455/54.1 |
| 5,513,381 | 4/1996 | Sasuta | 455/34.1 |
| 5,515,386 | 5/1996 | Takizawa et al. | 371/37.02 |
| 5,517,508 | 5/1996 | Scott | 371/37.02 |
| 5,542,108 | 7/1996 | Sasuta | 455/34.1 |
| 5,594,948 | 1/1997 | Talarmo et al. | 455/54.2 |
| 5,634,197 | 5/1997 | Paavonen | 455/58.1 |

FOREIGN PATENT DOCUMENTS

| | | | |
|---|---|---|---|
| 0425964 | 5/1991 | European Pat. Off. | H04J 3/06 |
| 2050119 | 12/1980 | United Kingdom | H04J 3/06 |
| 9535002 | 12/1995 | WIPO | H04Q 7/24 |

OTHER PUBLICATIONS

Richard A. Dean et al., "Toward a North American Standard for Mobile Data Services", *Digital Signal Processing*, No. 1, Jan. 1992, pp. 27–32.

David Weissman et al., "Interoperable Wireless Data", *IEEE Communications Magazine*, No. 2, Feb. 1993, pp. 68–77.

Antonio DeSimone et al., "Wireless Data: System, Standards, Services", *Wireless Networks*, No. 3, Oct. 1995, pp. 241–253.

*Primary Examiner*—Melvin Marcelo
*Attorney, Agent, or Firm*—Russell B. Miller; Thomas M. Thibault

[57] ABSTRACT

Synchronization and bit count integrity of a synchronous data stream is preserved end to end even as it is transmitted via a medium which does not preserve the synchronous nature of the synchronous data stream. A terminal equipment unit produces a constant rate bit stream which is provided to a communications unit. The communications unit produces first, second, and third data frames comprising, respectively, first, second, and third set of bits from the constant rate bit stream and first, second, and third length fields. The first, second, and third data frames are transmitted to a base unit which places the first set of bits from the first frame into a queue. A set of fill bits equal to the maximum number of bits contained in any frame is then placed into the queue. The base unit then determines the number of bits in the second set of bits of the third data frame, based on the first length field value and the third length field value. The base unit overwrites excess fill bits in the queue with the third set of bits. The number of excess fill bits is equal to the difference between the maximum possible number of bits which may be contained in any frame and the number of bits in the second set of bits.

21 Claims, 4 Drawing Sheets

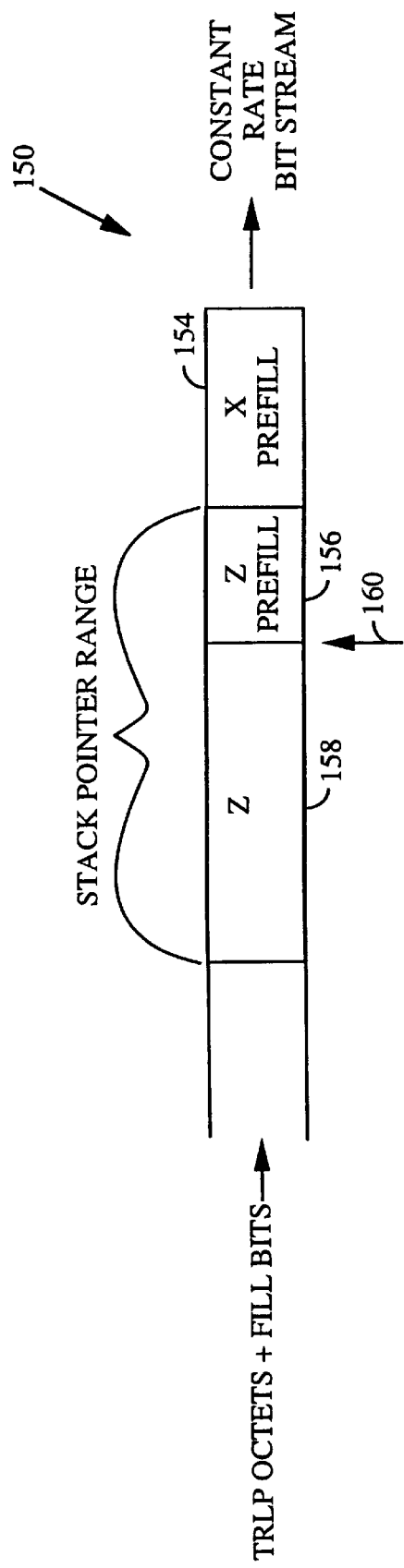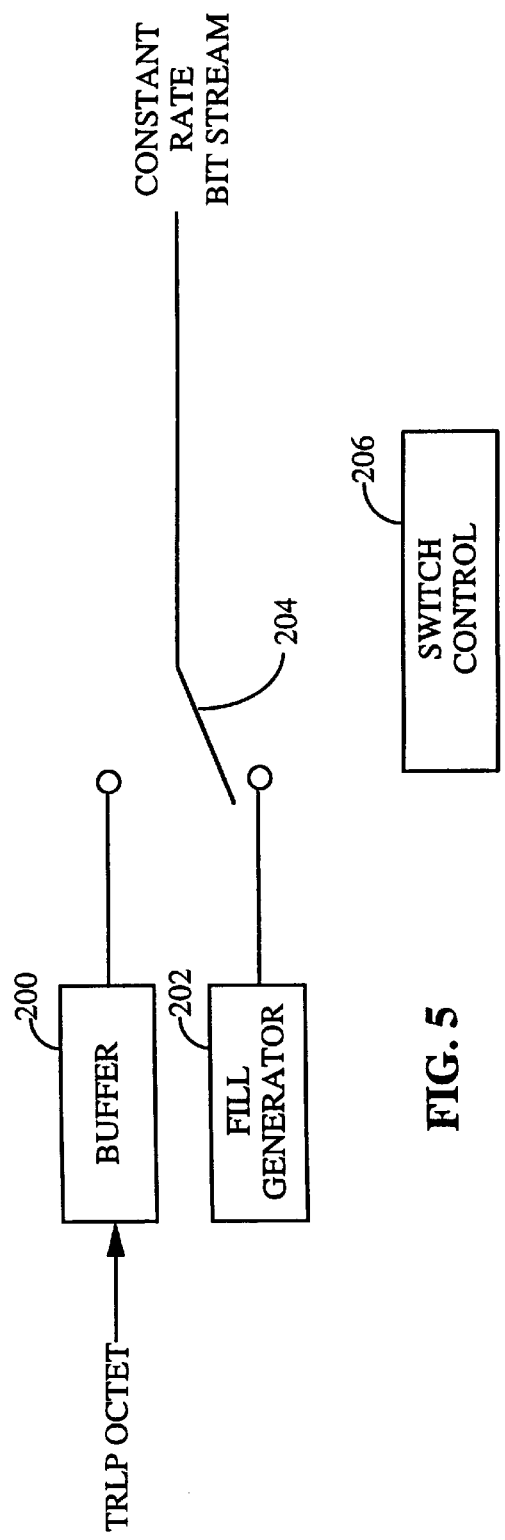

METHOD AND APPARATUS OF PROVIDING BIT COUNT INTEGRITY AND SYNCHRONOUS DATA TRANSFER OVER A CHANNEL WHICH DOES NOT PRESERVE SYNCHRONIZATION

BACKGROUND OF THE INVENTION

I. Field of the Invention

This invention relates generally to data transfer communication systems and, more particularly, to the transfer of a synchronous data stream via a medium which does not preserve the synchronous nature of the data stream.

II. Description of the Related Art

In a wireless telephone communication system, many users communicate over a wireless channel to connect to other wireless and wireline telephone systems. Communication over the wireless channel can be one of a variety of multiple access techniques. These multiple access techniques include time division multiple access (TDMA), frequency division multiple access (FDMA), and code division multiple access (CDMA). The CDMA technique has many advantages. An exemplary CDMA system is described in U.S. Pat. No. 4,901,307 issued Feb. 13, 1990 to K. Gilhousen et al., entitled "SPREAD SPECTRUM MULTIPLE ACCESS COMMUNICATION SYSTEM USING SATELLITE OR TERRESTRIAL REPEATERS," assigned to the assignee of the present invention and incorporated herein by reference.

In the just mentioned patent, a multiple access technique is disclosed where a large number of mobile telephone system users, each having a transceiver, communicate through satellite repeaters or terrestrial base stations using CDMA spread spectrum communication signals. In using CDMA communications, the frequency spectrum can be reused multiple times permitting an increase in system user capacity.

In the CDMA cellular system, each base station provides coverage to a limited geographic area and links the remote units in its coverage area through a cellular system switch to the public switched telephone network (PSTN). When a remote unit moves to the coverage area of a new base station, the routing of that user's call is transferred to the new base station. The base station-to-remote unit signal transmission path is referred to as the forward link and the remote unit-to-base station signal transmission path is referred to as the reverse link.

In a typical wireless telephone communication system, the remote unit transmitter may employ a vocoding system which encodes voice information in a variable rate format. For example, the data rate may be lowered due to pauses in the voice activity. The lower data rate reduces the level of interference to other users caused by the remote unit transmissions. At the receiver, or otherwise associated with the receiver, a vocoding system is employed for reconstructing the voice information. In addition to voice information, non-voice information alone or a mixture of the two may be transmitted by the remote unit.

When a remote unit is producing its own data for transmission, a internal vocoder produces from digital samples of the voice information encoded data at four different rates, e.g. approximately 8,000 bits per second (bps), 4,000 bps, 2,000 bps and 1,000 bps, based on voice activity during a 20 millisecond (ms) frame. Each frame of vocoder data is formatted with overhead bits as 9,600 bps, 4,800 bps, 2,400 bps, and 1,200 bps data frames. The highest rate data frame which corresponds to a 9,600 bps frame is referred to as a "full rate" frame; a 4,800 bps data frame is referred to as a "half rate" frame; a 2,400 bps data frame is referred to as a "quarter rate" frame; and a 1,200 bps data frame is referred to as an "eighth rate" frame. In neither the encoding process nor the frame formatting process is rate information included in the data. A vocoder which is suited for application in this environment is described in U.S. Pat. No. 5,414,796, entitled "VARIABLE RATE VOCODER," issued May 9, 1995 and assigned to the assignee of the present invention. When the remote unit receives data from an outside source such as a terminal equipment unit, the remote unit continues to process the data in this variable rate frame format.

When the original cellular telephone spectrum licenses were issued by the government, one of the restrictions on use of the spectrum was that the carriers could not provide dispatching system services. However, because of the great advantages of the CDMA system and the inherent expense and problems of deployment and maintenance of private dispatch systems, the government is re-examining this issue. The government itself would benefit greatly from such services.

Whereas typical wireless and wireline telephone service provides point-to-point service, dispatching services provide one-to-many service. Common usage of dispatch services are local police radio systems, taxicab dispatch systems, Federal Bureau of Intelligence and secret service operations, and general military communication systems.

The basic model of a dispatch system consists of a broadcast net of users. Each broadcast net user monitors a common broadcast forward link signal. If a net user wishes to talk, he presses a push to talk (PTT) button. Typically the talking user's voice is routed from the reverse link over the broadcast forward link. Ideally the dispatch system allows landline and wireless access to the system.

If the government agencies wish to use a dispatch service, in addition to the inherent privacy provided by the CDMA waveform, the agencies may want to use encryption mechanisms for further prevention of interception. Encryption mechanisms are typically operated based on an internally generated clock and generate data at a fixed rate. In order to use an encryption mechanism with a wireless system, the data rate, clock, and bit count integrity requirement of the encryption mechanism must be accommodated.

SUMMARY OF THE INVENTION

The present invention is an efficient buffering scheme to adapt the Transparent Radio Link Protocol to service a constant rate bit stream requiring bit count integrity and low delay. A terminal equipment unit provides a constant rate bit stream. A wireless link is used to transport the constant rate bit stream to a destination using a variable rate, frame based, non-error free protocol. At the receiving end, the constant rate bit stream must be reconstructed such that bit count integrity is maintained. The buffering system must introduce a minimal fixed delay consistent with the needs of a voice service system.

To achieve these requirements, a length field is added to each frame. The length field itself should be comprised of a low number of bits so as to minimize the impact of the length field to the overall bit carrying capacity of the link. The length field is a modulo value that is incremented in proportion to the size of the corresponding frame of data. If a frame is erased, the number of bits contained in the frame can be determined based on the length field of the next non-erased frame that is received. At the receiving station, a queue receives the frame data and produces the constant rate bit stream. When an erasure is received, a number of fill bits is added to the queue equal to the maximum number of bits which may have been contained in the erased frame. These fill bits are ready for use by the queue. When the next non-erased frame is received, if the erased frame is determined to have contained less than the maximum number of bits, the extra bits are overwritten by the data contained in the next non-erased frame.

BRIEF DESCRIPTION OF THE DRAWINGS

The features, objects, and advantages of the present invention will become more apparent from the detailed description set forth below when taken in conjunction with the drawings wherein:

FIG. 4 shows the Adaptation Layer queue which buffers the output of Transparent Radio Link Protocol to generate a constant rate bit stream; and FIG. 5 is an alternative embodiment to the linear buffer shown in FIG. 4.

DESCRIPTION OF THE PREFERRED EMBODIMENT

Figure 1:
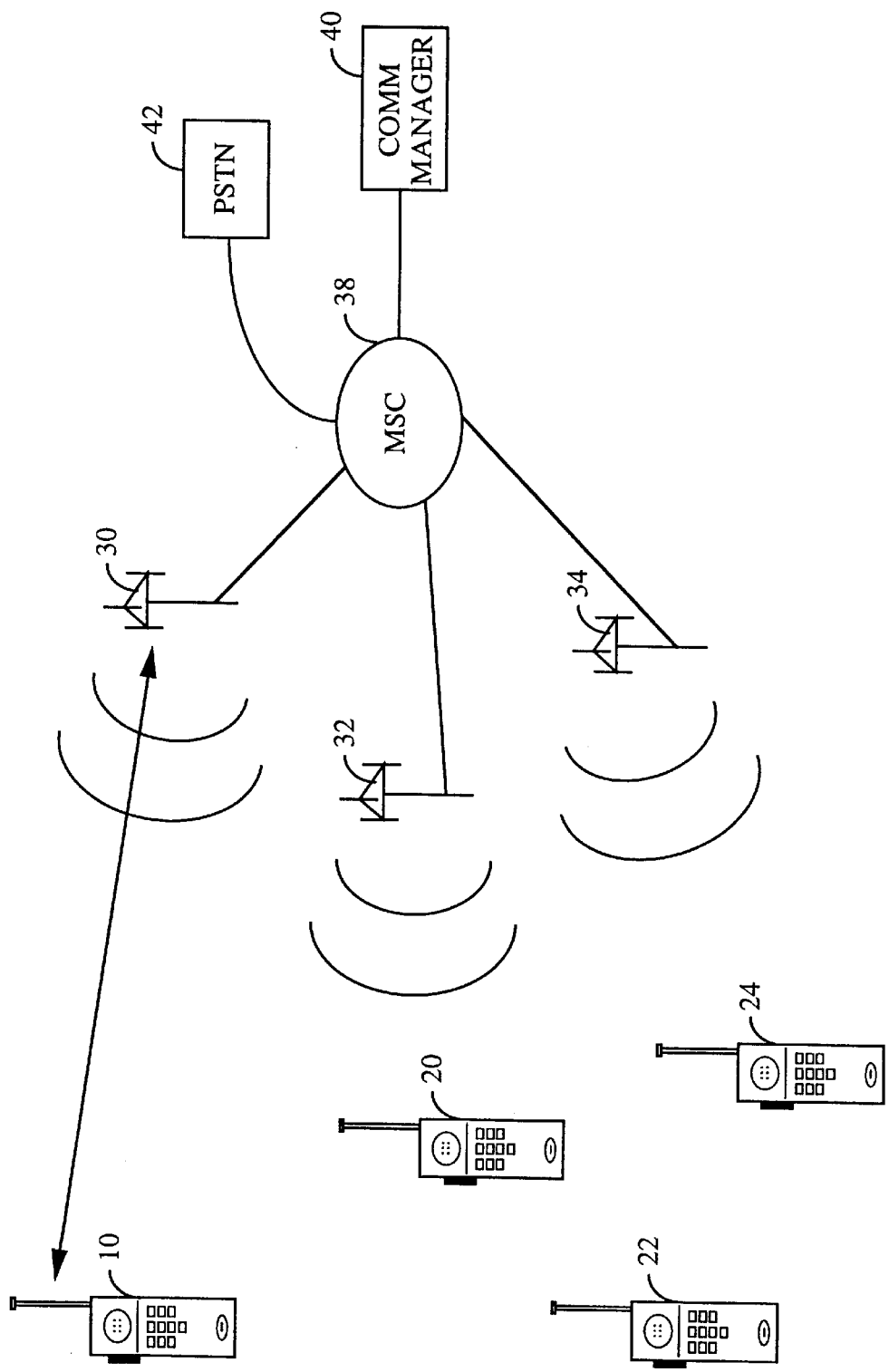
FIG. 1 shows a typical dispatch system.

FIG. 1 shows a typical dispatch system. In the preferred embodiment, remote units 10, 20, 22, and 24 may function both as dispatch units and as point-to-point telephones. In FIG. 1, remote unit 10 is currently an active talker and remote units 20, 22, and 24 are currently passive listeners. Base stations 30, 32, and 34 provide the broadcast forward link channel to remote units 10, 20, 22, and 24. Base station 30 is also receiving a reverse link signal from active remote unit 10. Mobile switching center (MSC) 38 coordinates the signaling to and from the base stations. In the preferred embodiment, the signaling is in accordance with "Mobile Station-Base Station Compatibility Standard for Dual-Mode Wideband Spread Spectrum Cellular Systems" TIA/EIA/IS-95, generally referred to simply as IS-95. In IS-95, the remote unit is referred to as a mobile station. Communications manager 40 controls the broadcast net such as the prioritizing of requests if two of the remote units press the 'push to talk' (PTT) button at the same time.

Although the preferred embodiment illustrates the present invention as used to marry an encrypted voice system into a point-to-point or despatch wireless CDMA system, the generic principles are applicable in a multiplicity of digital environments For example, the same principles can be applied to systems deployed using Time Division Multiple Access (TDMA) or other digital transmission techniques. The digital data could be FAX, or computer data. Generally the present invention is broadly applicable to any synchronous data stream which is transmitted via a medium which does not preserve the synchronous nature of the signal. Some examples of such systems are synchronous frame format video transmission systems, packet data bursts being carried by a synchronous bearer (isochronous systems) service, multiplexed voice and data traffic as carried by the Asynchronous Transfer Mode (ATM) over a connection oriented synchronous transport.

Figure 2:
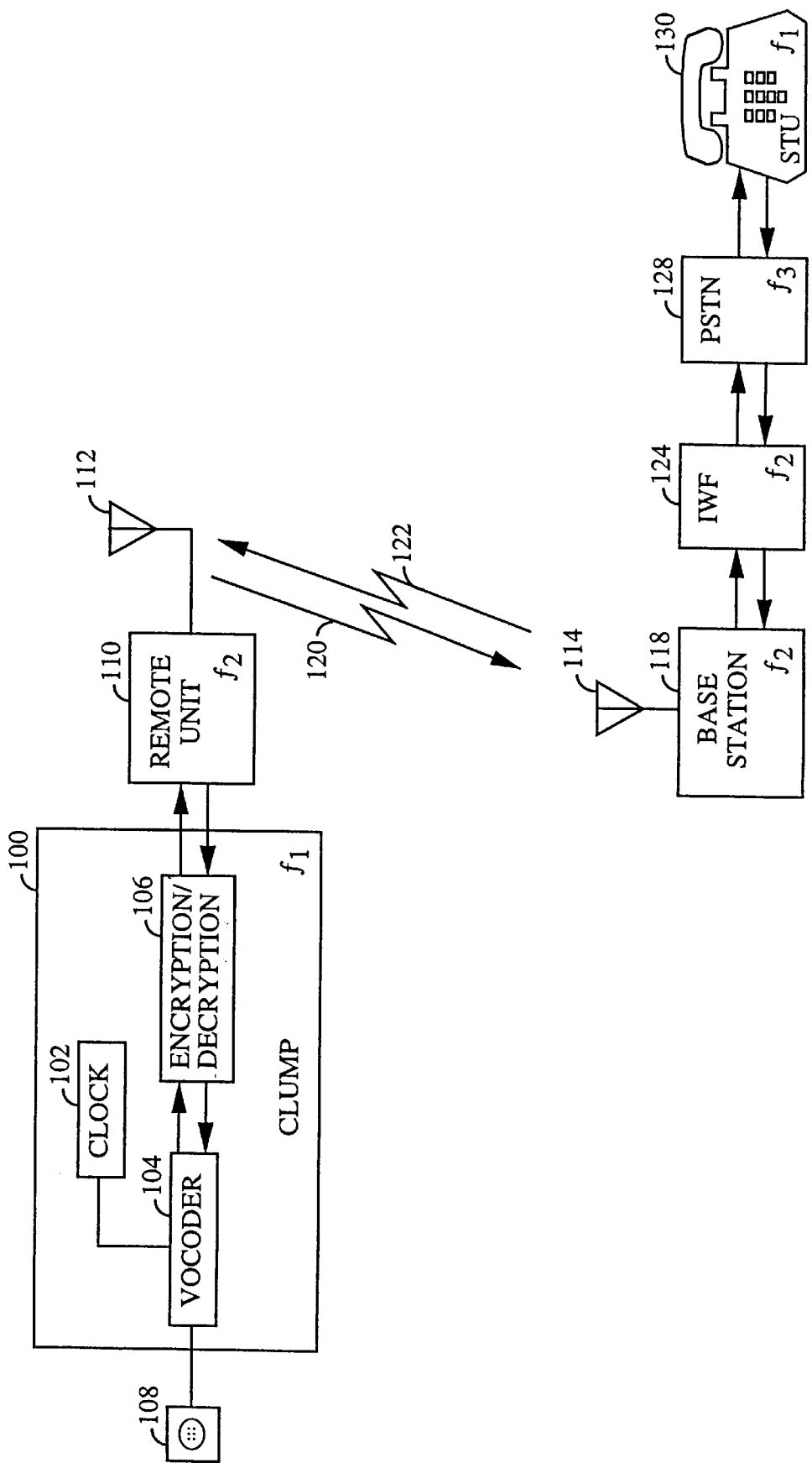
FIG. 2 shows a point-to-point secure voice connection between a remote unit and a landline telephone.

FIG. 2 shows an exemplary embodiment of the present invention. FIG. 2 is described with reference to a point-to-point secure voice connection between a remote unit and a landline telephone. The same techniques could to be directly applied to a point-to-point connect between two remote units or directly applied to a dispatch system. Remote unit 110 has been equipped with Crypto Lump (clump) 100. Clump 100 provides a steady stream of data bits to remote unit 110. Within clump 100, clock 102 produces an independent clock running at frequency $f_1$. Clock 102 may drift with respect to the CDMA clock running at frequency $f_2$ and the PSTN clock running at frequency $f_3$. Clock 102 is used to drive vocoder 104 to encode the voice signals received from speaker/microphone 108. The output of vocoder 104 is used to drive encryption/decryption 106. The output of encryption/decryption 106 is input into remote unit 110. Even though the output of encryption/decryption 106 is typically secure voice, the CDMA connection comprising remote unit 110, base station 118, and interworking function 124 acts upon the data as if it were data output from a standard digital equipment terminal unit. Although speaker/microphone 108 is shown as located within clump 100 it may be located within remote unit 110. In such a case an audio signal connection between clump 100 and remote unit 110 is required.

One aspect of the encryption and decryption process is that a steady stream of data is created at the encryption end and a steady stream of data must be recreated at the decryption end for the decryption process to work effectively. The decryption process can tolerate errors in the input data and still provide valid results therefore an error-free link is not needed. The critical aspect is that the bits going into the decryption process must have the same time alignment with respect to each other as they had coming out of the encryption process. If even one bit of data is missing, the decryption process produces trash rather than valid data. The process of providing a steady stream of data bits is called synchronization. The process of providing an equal number of bits into the decryption process as come out of the encryption process is called bit count integrity maintenance.

Returning to FIG. 2, clump 100 is producing a steady stream of encrypted data bits. Typically such encrypted data is produced at 4800 bits per second. In contrast to the steady stream of bits output from clump 100, remote unit 110 produces variable rate frame data in accordance with IS-95. In accordance with IS-95, remote unit 110 produces 20 millisecond (msec) frames of data. The frames of data can take on one of four different rates, e.g. approximately 8,000 bits per second (bps), 4,000 bps, 2,000 bps and 1,000 bps depending on the rate at which data is created or received. Each frame data is formatted with overhead bits as 9,600 bps, 4,800 bps, 2,400 bps, and 1,200 bps data frames. The highest rate data frame which corresponds to a 9,600 bps frame is referred to as a "full rate" frame; a 4,800 bps data frame is referred to as a "half rate" frame; a 2,400 bps data frame is referred to as a "quarter rate" frame; and a 1,200 bps data frame is referred to as an "eighth rate" frame.

The bit count pay load of one full rate frame is 160 bits. The bit count pay load for one half rate frame is 80 bits. If clump 100 is producing data at 4800 bps, it is producing 96 bits during each 20 msec frame duration. Therefore remote unit 110 creates a dithering combination of full rate and half rate data frames to accommodate the clump 100 output. For each frame, remote unit 110 adds a length field. The length field itself should be comprised of a low number of bits so as to minimize the impact of the length field to the overall bit carrying capacity of the link. The length field is a modulo index created by adding the length (i.e. number of bits) of the present frame to the value of the length field sent with the previous frame. In addition, other CDMA signaling, control, and overhead bits are added to the frames. The frames are then convolutionally encoded. The encoded bits are then interleaved. The interleaved bits are orthogonal Walsh encoded and spread with a pseudorandom noise PN code mask. The mask spread signal is then offset quadrature phase shift keyed (OQPSK) modulated with I and Q channel spreading sequences and transmitted through antenna 112 over wireless link 120.

Base station 118 receives the remote unit signal from wireless link 120 via antenna 114. Base station 118 removes the OQPSK modulation and the spreading mask. Base station 118 Walsh decodes the unspread signal and deinterleaves the signal. The signal is then decoded such as by a Viterbi decoder and passed from base station 118 to interworking functions (IWF) 124.

IWF 124 provides the functions needed for clump 100 to inter-work with secure telephone unit 130. A physical implementation may include a pool of modems. IWF 124 outputs pulse code modulated (PCM) data to public switch telephone network (PSTN) 128. PSTN 128 passes the PCM encoded data to secure telephone unit (STU) 130. Within STU 130 the data stream is decrypted and devocoded and the voice signal is output for the end listener. The link from STU 130 to clump 100 works nearly the same as the link just described.

The IS-95 wireless protocol is intended to carry voice signals. By the nature of the voice signal, a perfectly reproduced copy of the original digitized voice signal is not necessary for the reconstructed result to be intelligible toll-quality speech. Therefore, if excessive errors occur with respect to one frame, the frame can simply be erased. If the number of such erasures is kept to a minimum, the resulting effect on the voice is minimal. Therefore, the IS-95 link does not inherently provide error-free communication.

When the IS-95 link is used to provide a data connection where error-free data transfer is required, an additional protocol layer may be added to detect frame erasures. Upon detection of a frame erasure, the receiving terminal may request retransmission of the frame. However, such a scheme is not acceptable when dealing with a synchronous data connection which is carrying voice data. The error-detection and frame repetition operations introduce a delay to the system. In a synchronous system, the maximum delay introduced by such a system would have to be permanently inserted by a buffering scheme. Such delays are unacceptable in voice systems because they are large enough to be detectable by the end user.

Figure 3:
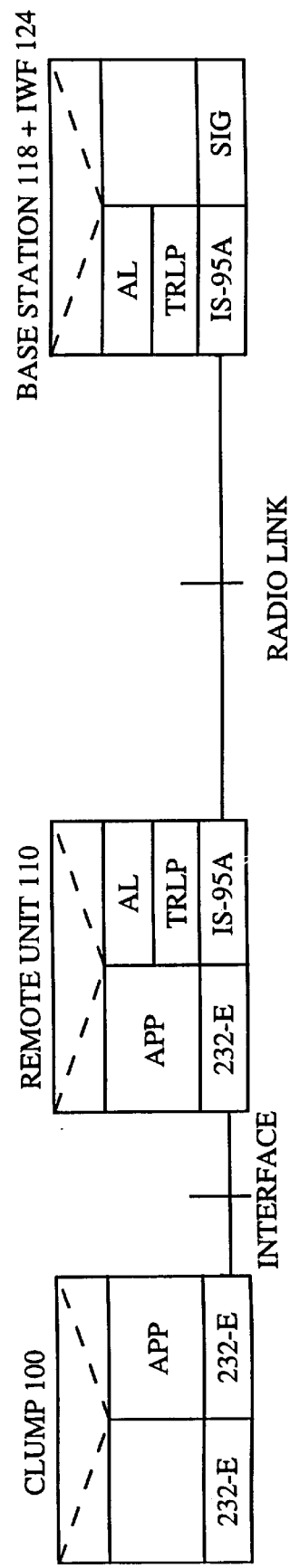
FIG. 3 shows the protocol stack with the Adaptation Layer of the Transparent Radio Link Protocol.

Because the IS-95 wireless interface does not provide synchronous data transfer with bit count integrity, the present invention provides a new protocol stack layer onto the existing protocol stack. FIG. 3 shows the protocol stack with the newly added Adaptation Layer for the Transparent Radio Link Protocol (TRLP). The Adaptation Layer may be used in conjunction with any user traffic which has a constant bit stream whether the bit steam is generated by secure voice terminal equipment or any arbitrary synchronous data source. The Adaptation Layer restores the synchronous nature of the traffic and the bit count integrity using a buffering scheme and an associated erased data replacement algorithm for data erased at the Transparent RLP layer. The advantage of the present invention is that the real-time queuing delay experienced by the data is minimized.

FIG. 3 shows the protocol stack with the Adaptation Layer of the Transparent Radio Link Protocol. Clump 100 provides a constant stream of data bits using an interface defined in Electronic Industry Association/Telecommunication Industry Association (EIA/TIA) document 232-E. Remote unit 110 receives the data using the same protocol. The APP layer is a standard modem AT command processing layer. The layer labeled AL is the Adaptation Layer. For the reverse link, the Adaptation Layer in remote unit 110 converts the constant rate bit stream into a series of octets which are passed to the TRLP layer. The Adaptation Layer also provides synchronization between the clump 100 clock running at $f_1$ and the clock within remote unit 110 running at frequency $f_2$. The IS-95 layer provides data and signaling for the radio link interface including the encoding, interleaving, spreading and OQPSK modulation described briefly above.

At base station 118 and IWF 128, the IS-95 layer removes the IS-95 operations and outputs either a frame of data or an erasure for each frame of data that it attempts to receive. The TRLP receives the frame data and outputs octets of data. The Adaptation Layer takes the incoming series of octets of data and frame erasure indications and produces a constant rate bit stream.

The Adaptation Layer is comprised of queue 150 shown in FIG. 4 which buffers the output of TRLP to generate a constant rate bit stream. Queue 150 does not begin to output a constant rate bit stream until both buffer prefill X area 154 and buffer prefill Z area 156 are full of bits. Obviously buffer prefill X area 154 introduces a unavoidable fixed delay. Buffer prefill X area 154 accounts for any clock drift between the clock running at frequency $f_1$ in clump 100 and the clock running at frequency $f_1$ in STU 130. The size of buffer prefill X area 154 is determined by the system specifications. For example in the preferred embodiment, a minimum acceptable time between sync resets is designated as 10 minutes. A sync reset occurs when buffering queue runs out of data so that it cannot produce a constant rate bit stream and the system must be reset and the buffer refilled in order for operation to continue. As the minimum acceptable time between sync resets increases, the size of the buffer must increase and the fixed delay also increases. The size of buffer prefill X area 154 is calculated based on the maximum drift between the STU 130 and clump 100 clocks. Buffer prefill X area 154 stores the highest possible number of bits by which the two units can draft with respect to one another over a ten minute interval. The actual size of the buffer prefill X area 154 is unrelated to operation of the prevent invention. The number of bits stored in buffer prefill X area 154 increases and decrease throughout the system operation.

Octets of data from buffer prefill Z area 156 are passed to buffer prefill X area 154 at approximately the same bps rate that bits are passed from buffer prefill X area 154 to the constant rate bit stream. The transfer of the bits from buffer prefill Z area 156 to buffer prefill X area 154 is based on the CDMA equipment clock frequency $f_2$. Buffer prefill Z area 156 is also prefilled with data before any data is delivered at the constant rate bit stream output and thus introduces a fixed delay in the system. In order to introduce the minimum possible fixed delay, the size of buffer prefill Z area 156 is equal to a small value. One convenient value is the average number of bits transferred to buffer prefill X area 154 before another set of data arrives from the TRLP layer. In the preferred embodiment, on average 96 bits are transferred from queue 150 every frame. Therefore in the preferred embodiment the size of buffer prefill Z area 156 is 12 octets.

In an alternative embodiment, the size of buffer prefill Z area 156 may be reduced to zero. When a connection is first established between clump 100 and STU 130, a dialing tone indication is sent from the originating unit to the receiving unit. When the receiving unit answers, the two units exchange a series of training tones. When both the sending and receiving units are ready to transfer data, each one sends a carrier to the other. The first instant in time that data can be sent from one unit is the instant that it detects the carrier from the other unit. As soon as the modem within IWF 124 detects the carrier, protocol dictates that IWF 124 produce the constant rate bit stream. If no frames are yet available, fill bits must be added to buffer prefill X area 154 and to buffer prefill Z area 156 to satisfy the protocol. If however the carrier is not provided to IWF 124 until just after the arrival of the first non-erased frame, buffer Z area 158 can immediately begin to output the received data at a constant rate. In this way, the next frame of data or an erasure indication is available before buffer Z area 158 is empty and buffer prefill Z area 156 may be eliminated.

Returning to the preferred embodiment, the nominal location of write pointer 160 is at the boundary of buffer prefill Z area 156 and buffer Z area 158. As data is shifted into buffer Z area 158 from the TRLP in the form of actual data and fill data, data is shifted out as octets from buffer prefill Z area 156. As such the location of write pointer 160 moves to indicate the location at which the next octet from the TRLP is to be placed. As discussed below, the write pointer can be moved within the stack pointer range comprised of both buffer prefill Z area 156 and buffer Z area 158. Because the size of buffer X area 154 may vary, write pointer 160 does not enter buffer prefill X area 154.

When an erasure indication is received, the size of the erased frame is unknown. To preserve bit count integrity, filler bits must be added to queue 150 to represent the erased bits. According to the present invention, the maximum number of bits that the erased frame of data could contain are added to queue 150. In the preferred embodiment, the full rate frame carries 160 bits and therefore 160 filler bits are added to queue 150. These bits immediately begin to shift through queue 150 and are output as necessary to the constant rate bit stream. If the erased frame was not a full rate frame, some of the bits added to queue 150 may still be in queue 150 when the next non-erased frame is received.

As noted above, each frame contains a length field which indicates the number of bits in the present frame relative to the previous frame. Using the data rates of the preferred embodiment, Table I shows an exemplary scheme for providing such a modulo length field. In the example in Table I, the length field is only four bits long and therefore takes on a value from 0 to 15. The value of the length field is incremented for each frame based on the frame rate. If a full rate frame is sent, the field value is increased by 8. If a half rate frame is sent, the field value is increased by 4. If a quarter rate frame is sent, the field value is increased by 2. If an eighth rate frame is sent, the field value is increased by 1.

TABLE I

| Frame rate | four bit modulo length field |
|---|---|
| quarter | 2 |
| half | 6 |
| half | 10 |
| eighth | 11 |
| full | 3 |
| eighth | 4 |
| full | 12 |

Following this scheme and assuming the initial value of the length field is 0, the first column of Table I indicates the rate of the data sent during the frame. The second column represents the corresponding length field value. Thus because the first frame sent is quarter rate, the field length value is 2. Because the next frame is half rate, the value is incremented by 4 and takes on value 6. The second consecutive half rate frame increases the value by another 4 such that the length field value is 10. The eighth rate frame increases the length field value to 11. The following full rate frame increases the value beyond the maximum 4 bit value of 15 and thus the modulo result of adding 8 is a length field value of 3. The eighth rate frame increases the length field value to 4 and the last full rate frame increases the length field value to 12.

Note that if a frame is erased the corresponding length field value is also erased. Now assume that the sequence in Table I is sent but that the first full rate frame is erased as shown in Table II.

TABLE II

| Frame rate | four bit modulo length field |
|---|---|
| quarter | 2 |
| half | 6 |
| half | 10 |
| eighth | 11 |
| erasure | — |
| eighth | 4 |
| full | 12 |

Notice that the length field value corresponding to the eighth rate frame following the erasure is the same. Also note that the number of bits in the eighth rate frame is known because the corresponding bits are available to be added to queue 150. Therefore the rate of the missing frame (and thus the number of fill bits which should have been added) can be determined by subtracting the sum of the last correctly received value before the erasure and the value added due to the first correctly received frame after the erasure from the first correctly received length field after the erasure. If the result is negative a modulo value of 16 is added to the result. For example, in the example shown in Table II:
the last correctly received value before the erasure=11;
the value added by the first correctly received frame=1;
the sum of these two=12;
the first correctly received length field after the erasure=4;
subtracting 4−12=−8; and
because the result is negative 16 is added=8.
Because the result is 8 we know that the erased frame was a full rate frame. If the frame was a half rate frame the result is 4. If the frame was a quarter rate frame the result is 2. And if the frame was an eighth rate frame the result is 1. Note this same technique can be used if two or more consecutive erasures are received. The actual rates of each erased frame are not critical—only the total number of erased bit needs to be determined.

The four bit length field described above is very limited in use because the value of the length field wraps if two consecutive full rate frames are received. A myriad of more complicated schemes could be used to accomplish similar results consistent with the scope of the present invention. For example, to accommodate the maximum, number of consecutive erasures which are anticipated, an actual system may be comprised of seven bits or more. Seven bits are needed to accommodate the reception of six consecutive full rate frame erasures. IS-95 defines an eight bit return link processor sequence field. The length field value may be substituted in place of the return link processor sequence field.

So returning again to FIG. 4, when a frame erasure indication is passed to the Adaptation Layer, a set of octet fill characters sufficient to account for a full rate frame are added to queue 150. In the preferred embodiment, 20 octets of value AA hexadecimal (hex) are added to queue 150 corresponding to the 160 bits of a full rate frame. (AA corresponds to the repeating series 10101010.) These bits are available immediately to begin feeding into the constant rate bit stream. If another erasure is received, a second set of 20 octets of value AA hex are added to queue 150. When the first non-erased frame of data is received, using a technique similar to the one described above, the number of erased bits is determined. If the number of erased bits is less than the number of bits added to queue 150, the queue stack pointer indicating where the next received set of bit should be placed is moved such that the excess bits are overwritten by the newly received bits.

For example, using the numerology of the preferred embodiment and the example of Table I, assume the sequence shown in Table III is received.

TABLE III

| Frame rate | four bit modulo length field |
|---|---|
| quarter | 2 |
| erasure | — |
| half | 10 |
| eighth | 11 |
| full | 3 |
| eighth | 4 |
| full | 12 |

When the erasure is received, 160 bits are added to queue 150. When the half rate frame is received with value 10, the formula given above is used to determine that a half rate frame was erased (4=10−(2+4)). As such only 80 fill bits are required to account for the erased bits even though 160 were added. Therefore before the received data bits corresponding to the correctly received half rate frame are added to queue 150, queue write pointer 160 is advanced towards the buffer X area 154 by the difference between the number of bits actually added and the number of bits which should have been added which in this case is 80 bits or 10 octets. In this way the excess fill bits buffer values are overwritten by the actual data received.

In an alternative embodiment, instead of adding a set of octet fill characters sufficient to account for a full rate frame to queue 150, the average number of bits received is added. For example, as noted above, an average 96 bits are transferred every frame and it follows that on average the number of bits that are destroyed when a frame is erased is 96. In such a scheme, 12 octets of data are added to queue 150 when a frame is erased. When the actual size of the erased frame is determined, write pointer 160 may be moved up towards buffer prefill X area 154 or back deeper into or toward buffer Z area 158. If write pointer 160 is moved deeper into queue 150, additional fill bits may need to be added. In the most general embodiment of the present invention, any number of fill bits could be added to queue 150 sufficient to keep the steady stream of octets flowing from buffer prefill Z area 156 to buffer prefill X area 154. In the most general embodiment consistent with the present invention, bits may be added in any quantity as long as the rate at which the bits are added is greater than or equal to the average rate at which bits are transferred from the queue.

Although the preferred embodiments are described with reference to a linear buffer, the ideas of the present invention may be applied directly to a circular buffer. A circular buffer uses both a read and a write pointer. In one implementation of a circular buffer, no actual dummy bits would be added when erasures are received. Instead, the write pointer need only be adjusted to a new position.

Also, the ideas of the present invention may be implemented as shown in FIG. 5. In FIG. 5, the TRLP octets are input into buffer 200. Fill generator 202 provides a constant stream of fill bits. Switch 204 chooses between the output of buffer 200 and fill generator 202 as controlled by switch control 206. Only those octets which are not received as erasures are input into buffer 200. When an erasure is received, switch control 206 is informed. When the fill bits are need to replace the bits of an erased frame, switch 204 connects fill generator 202 to the constant rate bit stream. Otherwise, switch 204 connects buffer 200 to the constant rate bit stream. The determination of the number of bits to add is still executed as describe above.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for preserving synchronization and bit count integrity for a synchronous data stream which is transmitted via a medium which does not preserve the synchronous nature of said synchronous data stream, comprising the steps of:

transmitting data frames comprising data bits and a length field;

receiving said data frames and replacing any of said data frames with an erasure frame if excess errors occur in a respective one of said data frames, said erasure frame comprising fill bits;

placing said data bits and said fill bits sequentially in a queue; and replacing said fill bits with data bits from a successive data frame in accordance with two of said data frames.

2. The method of claim 1, wherein said length field represents a data rate in a first data frame relative to a previous data frame.

3. The method of claim 2 wherein said length field is a modulo value in proportion to the data rate of a corresponding data frame.

4. The method of claim 1 wherein the step of placing said data bits and said fill bits sequentially in a queue comprises the steps of:

determining if a current frame is a data frame or an erasure frame;

placing data bits corresponding to said current frame sequentially into said queue if said current frame is a data frame; and placing a number of fill bits equal to the maximum number of bits in a data frame sequentially into said queue if said current frame is an erasure frame.

5. The method of claim 1 wherein the step of replacing said fill bits with data bits comprises the steps of:

identifying a first received erasure frame, a first data frame received immediately prior to said first received erasure frame, and a second data frame received immediately after said first received erasure frame;

determining the actual number of data bits transmitted corresponding to said first received erasure frame; and replacing a number of fill bits in said queue with data bits corresponding to said second data frame, said number of replaced fill bits equal to the difference between the maximum number of bits in a data frame and said actual number of data bits transmitted corresponding to said first received erasure frame.

6. The method of claim 5 wherein the step of determining the actual number of data bits transmitted corresponding to said first received erasure frame comprises the steps of:

adding said length field corresponding to said first data frame to a predetermined amount corresponding to a frame rate of said second data frame to produce a first value;

subtracting said first value from said length field corresponding to said second data frame to produce a second value, wherein said second value corresponds to a data rate of said data frame corresponding to said first received erasure frame;

adding a pre-determined modulo number to said second value if said second value is a negative number to produce a third value, wherein said third value corresponds to a data rate of said data frame corresponding to said first received erasure frame; and calculating the actual number of data bits transmitted in said first received erasure frame using said data rate.

7. A method for determining the number of data bits transmitted in a frame of data, said frame of data replaced by an erasure fame comprising fill bits, comprising the steps of:

identifying said erasure frame, a first data frame received immediately prior to said erasure frame, and a second data frame received immediately after said erasure frame;

adding a length field corresponding to said first data frame to a predetermined amount corresponding to a frame rate of said second data frame to produce a first value;

subtracting said first value from said length field corresponding to said second data frame to produce a second value, wherein said second value corresponds to a data rate of said data frame corresponding to said erasure frame;

adding a pre-determined modulo number to said second value if said second value is a negative number to produce a third value, wherein said third value corresponds to a data rate of said data frame corresponding to said erasure frame; and calculating the number of data bits transmitted in a data frame corresponding to said erasure frame using said second value if said second value is a positive number and using said third value if said second value is a negative number.

8. In a communication system, a method of providing a constant rate data stream comprising the steps of:

receiving a first frame of data, said first frame of data comprising a first number of bits and a first field length value;

placing said first frame of data in a queue;

moving a write pointer to indicate a queue position for a next received bit;

receiving an erasure in place of a second frame of data;

placing a first number of filler bits in said queue according to said write pointer;

moving said write pointer to indicate a next bit after a last one of said first number of filler bits in said queue;

receiving a third frame of data, said third frame of data comprising a third number of bits and a third field length value;

determining a second number of bits in said second frame of data based on said third number of bits, said first field length value and said third field length value; and moving, if necessary, said write pointer to a next bit after one of said first number of filler bits in said queue such that an actual number of filler bits equal to said second number of bits has been added to said queue.

9. The method of claim 8 wherein said first number of filler bits is equal to a maximum number of bits which may be received in any frame.

10. The method of claim 8 wherein said first number of filler bits is equal to an average number of bits per frame in a variable rate, frame based, non-error free data stream.

11. The method of claim 10 further comprising the step of placing a second number of filler bits in said queue and moving said write pointer to indicate a next bit after a last one of said second number of filler bits such that a total number of filler bits equal to said second number of bits has been added to said queue.

12. The method of claim 8 wherein said queue first produces a constant rate bit stream upon reception of an initial frame.

13. The method of claim 8 wherein said third field length value is equal to a modulo sum of said first field length value, said second number of bits and said third number of bits.

14. An apparatus for producing a constant rate data stream with bit integrity from a series of variable rate data frames and frame erasures comprising:

an adaptation layer in a protocol stack that receives said series of variable rate data frames and frame erasures, each frame having a frame length and a field length value, wherein, upon receipt of an erasure, said adaption layer outputs a fixed number of filler bits and, upon receipt of a first data frame received after said erasure, determines and outputs an erased frame length based on a first field length value and a first frame length corresponding to a first frame received after said erasure; and a queue that produces said constant rate data stream, that receives said fixed number of filler bits and receives data corresponding to each frame of said series which is not erased, and that produces a total number of said fixed number of filler bits equal to said erased frame length on said constant rate bit stream.

15. An apparatus for providing a constant rate data stream with bit integrity from a series of variable rate frames wherein at least one frame of said series of variable rate frames may be an erasure comprising:

an adaptation layer in a protocol stack that receives said series of variable rate frames, each frame having a frame length and a frame length value, and where when a first frame is received as an erasure, a corresponding frame length and a corresponding frame length value is unknown, wherein said adaptation layer outputs frame data from each frame of said series of variable rate frames which is not received as said erasure and determines said corresponding frame length of said erasure;

a first queue that receives said frame data from said adaptation layer;

a fill generator that produces fill bits; and a switch that connects an output constant rate bit stream to said first queue to transfer each frame of said series of variable rate frames which is not received as said erasure and that connects said output constant rate bit stream to said fill generator for a period of time necessary to transfer a series of bits having said corresponding frame length of said erasure at a time when data from said first frame would have been transferred if said first frame had not been received as said erasure, wherein said switch may connect said output constant bit stream to said fill generator before said adaptation layer determines said corresponding frame length.

16. An apparatus that provides synchronization and bit count integrity with minimum delay to a variable rate, frame based, non-error free data stream comprising:

means for receiving a first frame of data, said first frame of data comprising a first number of bits and a first field length value;

means for placing said first frame of data in a queue and moving a write pointer to indicate a queue position for a next received bit;

means for receiving an erasure indication in place of a second frame of data;

means for placing a first number of filler bits in said queue according to said write pointer and moving said write pointer to indicate a next bit after a last one of said first number of filler bits in said queue;

means for receiving a third frame of data, said third frame of data comprising a third number of bits and a third field length value;

means for calculating a second number of bits in said second frame of data based on said third number of bits, said first field length value and said third field length value; and means for moving, if necessary, said write pointer to indicate a next bit after one of said first number of filler bits in said queue such that an actual number of filler bits equal to said second number of bits has been added to said queue.

17. The apparatus of claim 16 wherein said first number of filler bits is equal to a maximum number of bits which may be received in any frame.

18. The apparatus of claim 16 wherein said first number of filler bits is equal to an average number of bits per frame on said variable rate, frame based, non-error free data stream.

19. The apparatus of claim 18 further comprising means for placing a second number of filler bits in said queue and moving said write pointer to indicate a next bit after a last one of said second number of filler bits such that a total number of filler bits equal to said second number of bits has been added to said queue.

20. The apparatus of claim 16 wherein said queue begins to produce a constant rate bit stream upon reception of an initial frame.

21. The apparatus of claim 16 wherein said third field length value is equal to a modulo sum of said first field length value, said second number of bits and said third number of bits.

* * * * *